United States Patent
Wu et al.

(10) Patent No.: US 10,603,888 B2
(45) Date of Patent: Mar. 31, 2020

(54) FILLING AND LEVELING METHODS AND APPARATUS FOR BUILDING TIGHT TOLERANCE SURFACES

(71) Applicant: The Boeing Company, Chicago, IL (US)

(72) Inventors: Ronald Yick Wu, Woodinville, WA (US); Tho Ngoc Dang, Lynnwood, WA (US)

(73) Assignee: The Boeing Company, Chicago, IL (US)

(*) Notice: Subject to any disclaimer, the term of this patent is extended or adjusted under 35 U.S.C. 154(b) by 51 days.

(21) Appl. No.: 14/249,830

(22) Filed: Apr. 10, 2014

(65) Prior Publication Data

US 2015/0290915 A1 Oct. 15, 2015

(51) Int. Cl.
| | |
|---|---|
| *B32B 37/18* | (2006.01) |
| *B64C 23/00* | (2006.01) |
| *B64C 1/12* | (2006.01) |
| *B64C 3/26* | (2006.01) |
| *B32B 37/14* | (2006.01) |
| *B64C 3/36* | (2006.01) |
| *F16J 15/04* | (2006.01) |

(52) U.S. Cl.
CPC ......... *B32B 37/182* (2013.01); *B32B 37/142* (2013.01); *B64C 1/12* (2013.01); *B64C 3/26* (2013.01); *B64C 3/36* (2013.01); *B64C 23/00* (2013.01); *F16J 15/04* (2013.01); *B32B 2605/08* (2013.01); *B32B 2605/12* (2013.01); *B32B 2605/16* (2013.01); *B32B 2605/18* (2013.01)

(58) Field of Classification Search
CPC .. B64C 3/36; B64C 9/02; B64C 21/00; B64C 21/10; B64C 1/12; B64C 1/069; B64C 1/0009; B64C 1/38; B64C 3/26; B64C 23/00; Y10T 29/49732; Y10T 29/49746
USPC ...... 277/316, 645, 605; 244/130, 131, 123.5
See application file for complete search history.

(56) References Cited

U.S. PATENT DOCUMENTS

| | | | | |
|---|---|---|---|---|
| 3,972,762 | A * | 8/1976 | Kawahara | G03C 1/74 156/196 |
| 4,095,760 | A * | 6/1978 | Sommer | B64C 3/26 156/85 |

(Continued)

FOREIGN PATENT DOCUMENTS

EP  2070816  6/2009

OTHER PUBLICATIONS

European Patent Office, "European Search Report", issued in connection with European application No. 15158912.4 dated Jul. 27, 2015, 7 pages.

(Continued)

*Primary Examiner* — Christopher D Hutchens
(74) *Attorney, Agent, or Firm* — Hanley, Flight & Zimmerman, LLC.

(57) ABSTRACT

Filling and leveling methods and apparatus for building tight tolerance surfaces are disclosed. An example method includes applying one or more of a tape or a sealant along an interior of a recess of a vehicle to move through a fluid. The example method includes leveling the one or more of the tape or the sealant to a first height at a first edge of the recess and a second height at a second edge of the recess to modify a fluid dynamic property of a fluid flow over the vehicle.

20 Claims, 8 Drawing Sheets

(56) References Cited

U.S. PATENT DOCUMENTS

| | | | | |
|---|---|---|---|---|
| 4,156,054 A | * | 5/1979 | Gurewitsch | B29C 65/00 428/583 |
| 4,258,889 A | * | 3/1981 | Hunt | B64C 21/06 156/293 |
| 4,396,826 A | * | 8/1983 | Orcutt | B32B 17/10018 156/273.9 |
| 4,861,643 A | * | 8/1989 | Scollard | B64C 1/06 244/131 |
| 4,933,227 A | * | 6/1990 | Stewart | B32B 17/10018 156/102 |
| 5,952,042 A | * | 9/1999 | Rafferty | B23K 35/0233 156/94 |
| 6,758,924 B1 | * | 7/2004 | Guijt | B29C 73/10 156/64 |
| 6,915,987 B2 | * | 7/2005 | Fisher | B64C 1/14 156/92 |
| 7,118,070 B2 | * | 10/2006 | Abrams | B60J 1/006 244/129.3 |
| 7,784,799 B2 | * | 8/2010 | Etling | B64C 1/12 277/630 |
| 7,915,371 B2 | * | 3/2011 | Byrd | C08G 18/61 427/387 |
| 8,282,042 B2 | * | 10/2012 | Parikh | B64C 1/12 244/130 |
| 2002/0079405 A1 | * | 6/2002 | Layukallo | B64C 9/00 244/130 |
| 2003/0098546 A1 | * | 5/2003 | Beyssac | B64F 5/0036 277/300 |
| 2005/0140098 A1 | | 6/2005 | Etling | |
| 2005/0215686 A1 | * | 9/2005 | Fernihough | C23C 8/04 524/430 |
| 2006/0261505 A1 | * | 11/2006 | Bissonnette | C04B 28/06 264/36.2 |
| 2008/0258008 A1 | * | 10/2008 | Cooper | B64C 1/12 244/131 |
| 2009/0294589 A1 | | 12/2009 | Berry et al. | |
| 2010/0077690 A1 | * | 4/2010 | Durand | B64C 1/12 52/578 |
| 2010/0170994 A1 | * | 7/2010 | Burns | B64C 1/12 244/130 |
| 2010/0308170 A1 | * | 12/2010 | Hadley | B64C 1/12 244/131 |
| 2011/0033728 A1 | * | 2/2011 | Smith | B23P 6/04 428/642 |
| 2012/0163981 A1 | * | 6/2012 | Hong | F01D 5/288 416/224 |
| 2013/0037655 A1 | * | 2/2013 | Bradley | B64C 7/00 244/124 |
| 2014/0209232 A1 | * | 7/2014 | Havar | B29D 99/001 156/92 |
| 2015/0044369 A1 | * | 2/2015 | Keener | B05D 5/00 427/256 |
| 2015/0252903 A1 | * | 9/2015 | Boyd | F16J 15/061 244/119 |

OTHER PUBLICATIONS

European Patent Office, "Communication Pursuant to Article 94(3) EPC," issued in connection with European Application No. 15 158 912.4, dated Apr. 30, 2018, 6 pages.

* cited by examiner

FILLING AND LEVELING METHODS AND APPARATUS FOR BUILDING TIGHT TOLERANCE SURFACES

FIELD OF THE DISCLOSURE

This disclosure relates generally to recesses existing between surfaces on a vehicle and, more particularly, to filling and leveling methods and apparatus for building tight tolerance vehicle surfaces.

BACKGROUND

Recesses or troughs often exist between adjacent surfaces of a vehicle, such as for example, an aircraft, a watercraft, or an automobile. Such openings facilitate access to, for example, fasteners used to secure parts of the vehicle, which may need to be replaced during normal maintenance of the vehicle.

As the vehicle moves, fluids such as air or water flow over the surfaces of the vehicle, including any recesses formed therein. The turbulence of such fluid flow can impact operational efficiencies of the vehicle as it moves through the fluid. For example, during flight, air flows over a wing of an aircraft, including any troughs therein. Laminar flow generally refers to the uninterrupted flow of air over the wing during flight. If the flow of air is interrupted, turbulent flow is created and may result in eddies or cross currents that disturb the direction of air flow over the wing. Turbulent flow affects the forces experienced by the aircraft during flight by decreasing lift (e.g., the force generated by the wings to keep the aircraft in the air) and increasing drag (e.g., air resistance). Aerodynamic inefficiencies such as drag result in other operational inefficiencies such as increased fuel usage by the aircraft. Similarly, a submarine moving through water can experience hydrodynamic inefficiencies in the form of drag.

SUMMARY

An example method disclosed herein includes applying one or more of a tape or a sealant along an interior of a recess on a vehicle to move through a fluid. The example method includes leveling the one or more of the tape or the sealant to a first height at a first edge of the recess and a second height at a second edge of the recess to modify a fluid dynamic property of a fluid flow over the vehicle.

An example method disclosed herein includes filling a recess between a first surface of a vehicle and a second surface of the vehicle with a first material. The first material is to create a first layer in the recess. The example method includes filling the recess with a second material. The second material to create a second layer proximate to the first layer. The example method also includes adjusting a height of one or more of the first layer or the second layer relative to the first surface and the second surface so that a total height of the first layer and the second layer is substantially equal to at least one of the first surface or the second surface to increase laminar flow of a fluid over the vehicle.

An example apparatus disclosed herein includes a trough formed by a first surface of vehicle and a second surface of the vehicle, the first surface adjacent the second surface. The vehicle is to move through a fluid. The example apparatus includes one or more of a first layer or a second layer disposed in the trough. The first layer comprises an elastomer and the second layer comprises a tape. In the example apparatus, the first surface, the second surface, and one or more of the first layer or the second layer are to substantially form a third surface. The third surface to adjust a fluid dynamic property of a fluid flow over the vehicle.

Wherever appropriate, the same reference numbers will be used throughout the drawing(s) and accompanying written description to refer to the same or like parts. The figures are not to scale. Instead, to clarify multiple layers and regions, the thickness of the layers may be enlarged in the drawings. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Vehicles often include recesses, gaps, troughs, or, more generally, openings between adjacent surfaces that are not in direct contact. Example vehicles can include an aircraft (e.g., an airplane, a helicopter, etc.), a watercraft (e.g., a submarine, a ship, etc.), an automobile (e.g., a car, a truck, etc.), or other conveyance means (e.g., a projectile). Example surfaces of such vehicles where recesses can be found include, for example, an aircraft wing or a ship hull. The recesses may facilitate access to various components of the aircraft wing or ship hull that may need to be replaced during maintenance of the respective vehicles. During operation of a vehicle, the vehicle moves through a fluid such as air or water and a fluid flow is created over the vehicle, including over the recess. The fluid flow has associated fluid dynamic properties, such as turbulence, that can affect the operation of the vehicle.

As an example, a recess can extend parallel to or perpendicular to a leading or front edge of an aircraft wing and/or a trailing or rear edge of the wing. During flight, a layer of air clings to the wing surface as air flows over the wing. This layer is referred to as a boundary layer and may exhibit laminar or turbulent flow conditions. Laminar flow occurs when streams of air of the boundary layer flow in parallel layers. Laminar flow reduces drag experienced by the aircraft, thereby requiring less energy to move the wing, and, thus, the aircraft, through the air. Other benefits of laminar flow include improved fuel usage and reduced aircraft weight.

Turbulent flow results when the flow of air over the wing is irregular. Turbulent flow can be characterized by eddies or cross currents that disrupt the streamlined, parallel flow of air associated laminar flow. Turbulent flow may result from structural components of the wing such as rivets, seams, hinges and/or flaps that interrupt the flow of air (e.g., by acting as a projection) as well as external factors, such as ice that may accumulate on the wing surface.

Although some instances of turbulent flow result from normal operation of the aircraft wing, such as movement of flaps during landing, reducing opportunities for the creation of turbulent flow in wing design promotes operational and economic efficiencies by decreasing drag and improving fuel usage. Laminar flow can be increased by providing a substantially smooth surface for the air to flow over. Therefore, substantially removing gaps from the surface of the aircraft wing, such as a trough between two adjacent or adjoining surfaces of the wing, to create a substantially smooth wing profile serves to enhance laminar flow and, as a result, improve operation of the aircraft during flight.

Vehicles such as automobiles or watercrafts are also affected by fluid dynamics during operation as disclosed above with respect to the aircraft wing. Similar to an aircraft, automobiles are subject to a degree of air resistance during travel. Also, as a watercraft (e.g., a submarine) moves underwater, interruptions to a flow of water over an exterior surface of the watercraft can increase drag. Thus, fluid dynamic properties can affect an efficiency of a vehicle as it travels through air or water. Minimizing opportunities for fluid flow disruptions during motion of the vehicle can reduce operational efficiencies.

Example methods and apparatus disclosed herein enable filling and leveling of a recess such as a trough located on an aircraft wing surface. Filling the trough such that the material disposed in the interior of the trough is substantially level with the adjacent wing surfaces increases the smoothness of the wing profile and reduces disruptions to air flow that may be caused by a gap associated with the trough. In such a manner, the examples and apparatus disclosed herein enhance laminar flow as air streams over the wing during flight. Although the example methods and apparatus contained herein are disclosed in the context of a trough in an example airplane wing, the example methods and apparatus can be implemented with other vehicles having recesses, including other types of aircraft, as well as watercraft, automobiles, and/or other conveyance objects to modify a fluid dynamic property of a fluid flow over the vehicles.

Example methods and apparatus disclosed herein provide for filling and leveling the trough or the recess within a tight tolerance range, or an allowable difference between a height of the filling material(s) and heights of adjacent surfaces. In providing for minimal deviation between the height of the filling material(s) relative to the heights of the adjacent surfaces, the examples disclosed herein substantially eliminate opportunities for turbulent flow as the air flows over the trough. The example methods and apparatus disclosed herein provided for compensation in height differences between the adjacent surfaces to create a substantially smooth wing profile.

Examples methods and apparatus disclosed herein utilize one or more materials to fill the interior of the trough and to provide structural support to the trough. The materials generally include, alone or combination, tape (e.g., pressure sensitive tape) and an elastomer (e.g., a sealant). Materials disclosed herein in connection with the example methods and apparatus withstand environmental variables that the aircraft may encounter during operation, including, but not limited to, temperature variables and/or exposure to salt water. In examples involving other types of vehicles, the materials can be selected based on environmental exposure, such as in the case of a vehicle that is at least partially immersed in water during operation. Also, the example materials disclosed herein may be selectively arranged to accommodate additional materials, such as surfacers and/or paint, to create an integrated surface with respect to the trough and the adjacent surfaces.

In contrast to known methods for filling and/or covering a recess such as a trough, the example methods and apparatus disclosed herein provide for flexibility in filling troughs of different sizes, including a trough varying in depth and/or width as compared to other troughs as well as within the trough itself. Further, materials used to fill the trough may be removed to provide access to components of the vehicle (e.g., components of the aircraft wing) and replaced without requiring specialized tools, skills, and/or a high degree of precision.

Figure 1:
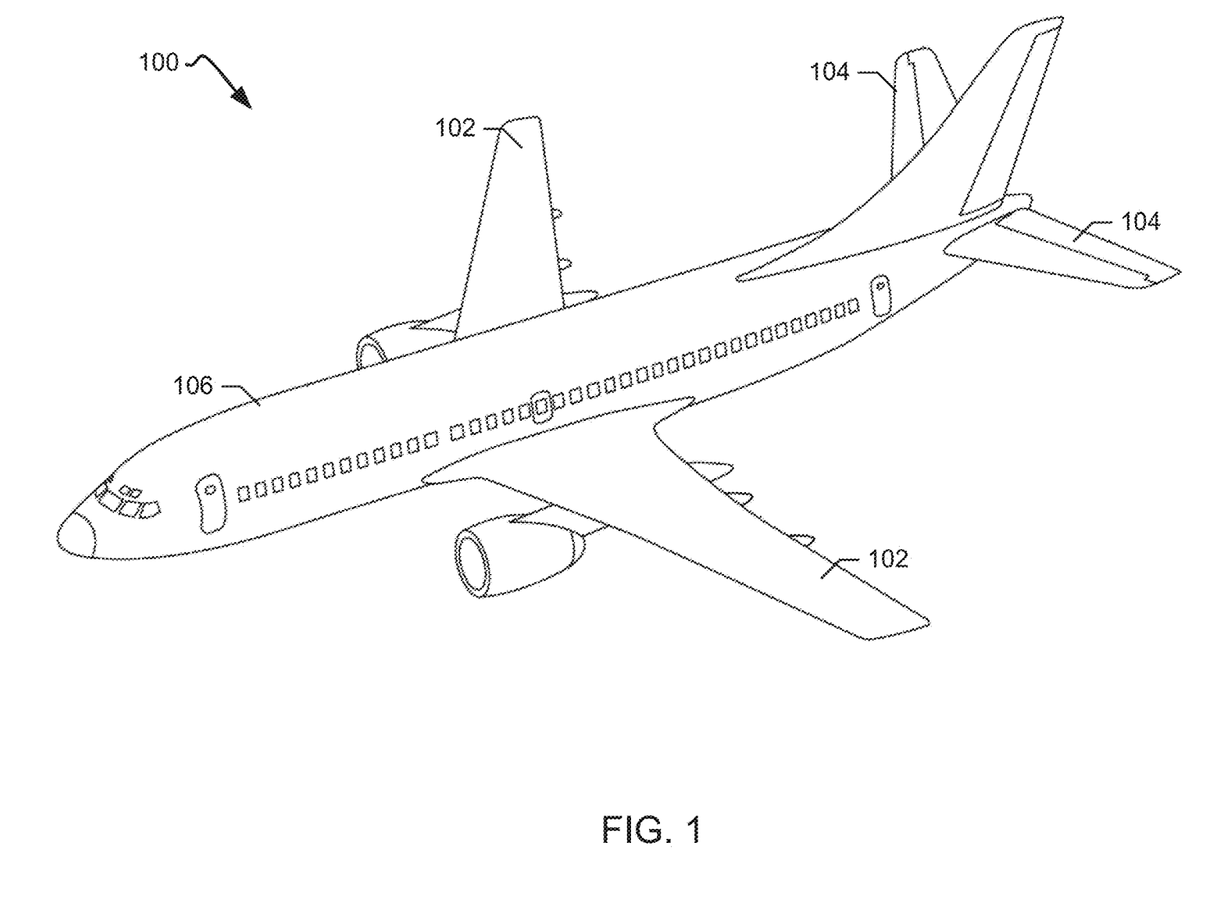
FIG. 1 illustrates an example aircraft in which the examples disclosed herein can be implemented.

Turning now to the figures, FIG. 1 illustrates an example aircraft 100 having wings 102 and horizontal stabilizers 104 attached to a fuselage 106 in which the examples disclosed herein can be implemented. The examples disclosed herein may be applied to any of the wings 102, the horizontal stabilizers 104 and/or any other exterior or outboard structure (e.g., a vertical stabilizer, a canard stabilizer, etc.) of the fuselage 106. For example, the wings 102 and/or the horizontal stabilizers 104 may comprise a plurality of components, including internal and external surfaces, stringers (e.g., a supporting frame), flaps, hinges, and fasteners for joining the plurality of components.

During flight, a boundary layer of air flows over the external surface of, for example, the wing 102. As mentioned above, the boundary layer may comprise laminar flow or turbulent flow. In some instances, as the air flows over the wing, the flow transitions from laminar (e.g., predictable velocities) to turbulent (e.g., fluctuating and/or irregular velocities) as a result of encountering, for example, irregularities on the surface of the wing.

Figure 2:
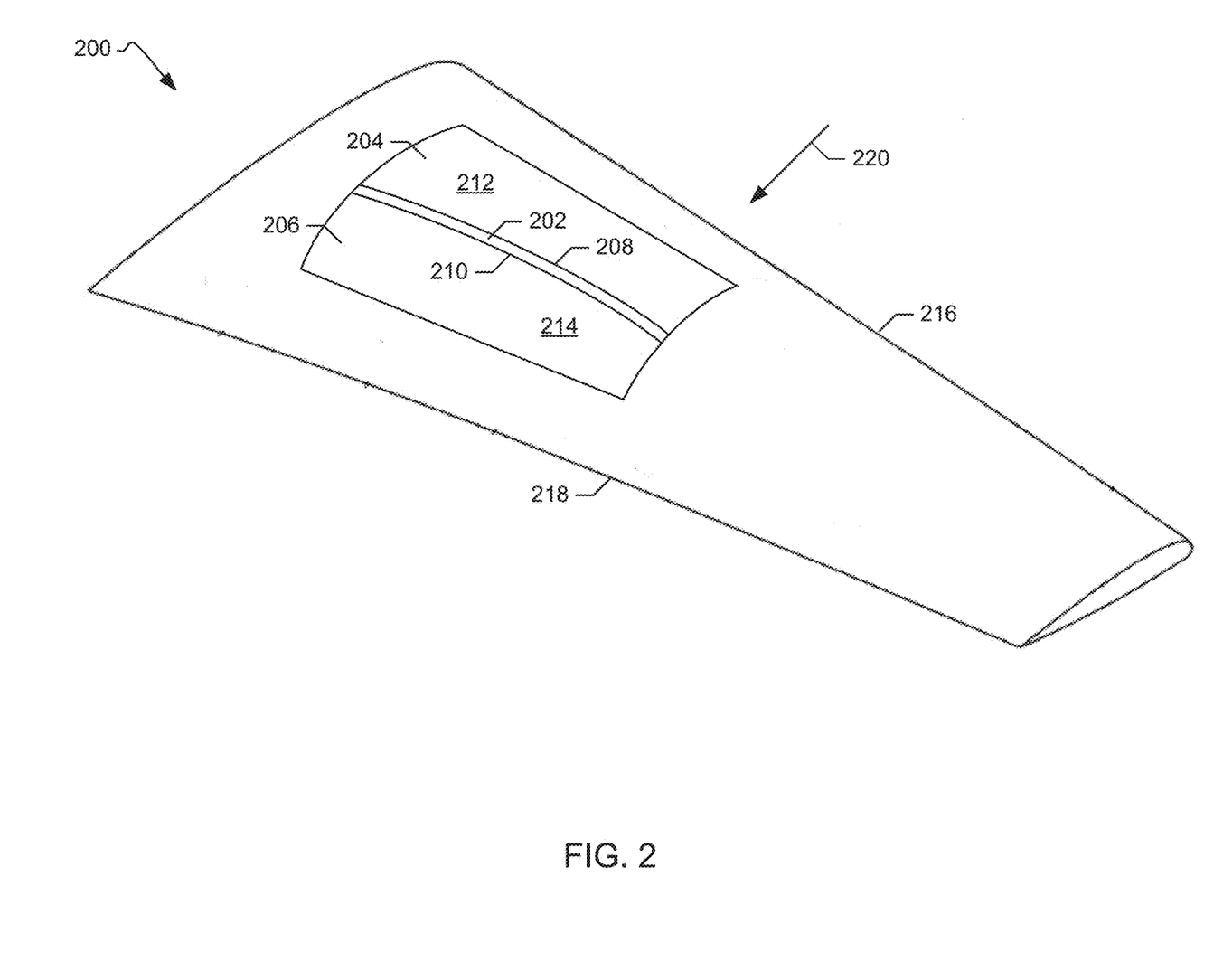
FIG. 2 illustrates an example aircraft wing having a trough in which the examples disclosed herein can be implemented.

FIG. 2 is view of an example aircraft wing 200 with a recess or trough 202 in which the examples disclosed herein can be implemented. The example wing 200 may be associated with the example aircraft 100 of FIG. 1. As noted above, although the trough 202 will be described as part of the example wing 200 for illustrative purposes, the trough 202 can be found on portions of other vehicles such as automobiles or watercraft.

The example wing 200 includes a first panel, or surface, 204, and a second panel, or surface, 206. The example wing 200 may include additional panels and/or surfaces. In some examples, the first panel 204 and the second panel 206 are adjacent to each other, but not in direct contact. Rather, a first edge 208 of the first panel 204 and a second edge 210 of the second panel 206 are spaced apart (e.g., a width or distance of one-half inch). The distance between the first edge 208 and the second edge 210 defines an opening or width of the trough 202. The first edge 208 and the second edge 210 can also correspond to edges of the trough 202.

The trough 202 has a depth, which in some examples is defined by the first panel 204 and the second panel 206. In some examples, a height of the first panel 204 and a height of the second panel 206 are substantially equal such that respective outer surfaces 212, 214 of the first panel 204 and the second panel 206 are level across the wing 200. In other examples, the height of the first panel 204 is different from the height of the second panel 206. For example, the first panel 204 may be lower than the second panel 206, thereby creating a slope surface portfolio on the wing 200. In such examples, the trough 202 also has a sloped configuration defined by a height difference between the first edge 208 of the first panel 204 and the second edge 210 of the second panel 206. In other examples, the depth of the trough 202 is defined by interior surfaces of the wing 200 that may be covered by the first and second panels 204, 206.

Further, the trough 202 includes an interior supporting surface (see, for example, FIG. 3), which forms a bottom surface of the trough 202 when the wing 200 is in a horizontal position. In some examples, the supporting surface of the trough 202 is associated with one or more of the first panel 204 or the second panel 206. In other examples, the supporting surface of the trough 202 is formed by an inner surface of the wing 200 that is separate from the first panel 204 and/or the second panel 206 (e.g., an internal supporting surface).

The example wing 200 may include one or more troughs in addition to the trough 202 having varying depths and/or widths. As described above, the trough 202 may provide access to, for example, interior components of the wing 200, may facilitate access when replacing one or more of the first panel 204 or the second panel 206 or fasteners that secure the first and second panels 204, 206 to the wing 200 as part of maintenance of the wing 200.

In the example wing 200, the trough 202 is parallel to a leading or front edge 216 of the wing 200 and to a trailing or rear edge 218 of the wing 200. The leading edge 216 is the edge of the wing 200 where the air first encounters the wing 200, as illustrated by the arrow 220 representing the direction of air flow over the wing 200. In some examples, the depth of the trough 202 at the leading edge 216 is different than the depth of the trough 202 at the trailing edge 218. That is, in some examples, the heights of the first panel 202 and/or the second panel 204 are not uniform across the wing 200, example, the wing 200 is generally thinner at the trailing edge 218. Thus, the surfaces defining the trough 202 (e.g., the first and second panels 204, 206) may have a first thickness at the leading edge 216 and a second thickness at the trailing edge 218 such that the trough 202 tapers toward the trailing edge 218. Also, the orientation of the trough 202 with respect to the leading edge 216 and the trailing edge 218 can vary from the parallel orientation of the example trough 202 of FIG. 2. For example, the trough can be perpendicular to the leading edge 216 and the trailing edge 218 or angled with respect to the leading edge 216 and/or the trailing edge 218.

As shown by the direction of the arrow 220, the air encounters the trough 202 as it flows over the wing 200. In encountering the trough 202, the flow of air may be affected by the opening or gap associated with the trough 202. Rather than flowing over a substantially smooth surface (e.g., across one or more of the first panel 204 or the second panel 206), the trough 202 may disrupt the flow of air, thereby contributing to turbulent flow of air over the wing 200. Thus, filling the trough 202 with removable material(s) so that the trough 202 is substantially level with the first panel 204 and/or the second panel 206 increases laminar flow while providing for ease of access to the components of the wing 200 via the trough 202. In examples where the trough 202 is associated with other vehicles, filling the trough also modifies a fluid dynamic property of a fluid flowing over the vehicle (e.g., by increasing laminar flow of a fluid over the vehicle). For example, when the trough 202 is formed between two submersed surfaces of a ship hull, filling the trough 202 reduces disruptions to the flow of water over the submersed surfaces while providing for access to components (e.g., fasteners) of the hull during ship maintenance.

Figure 3:
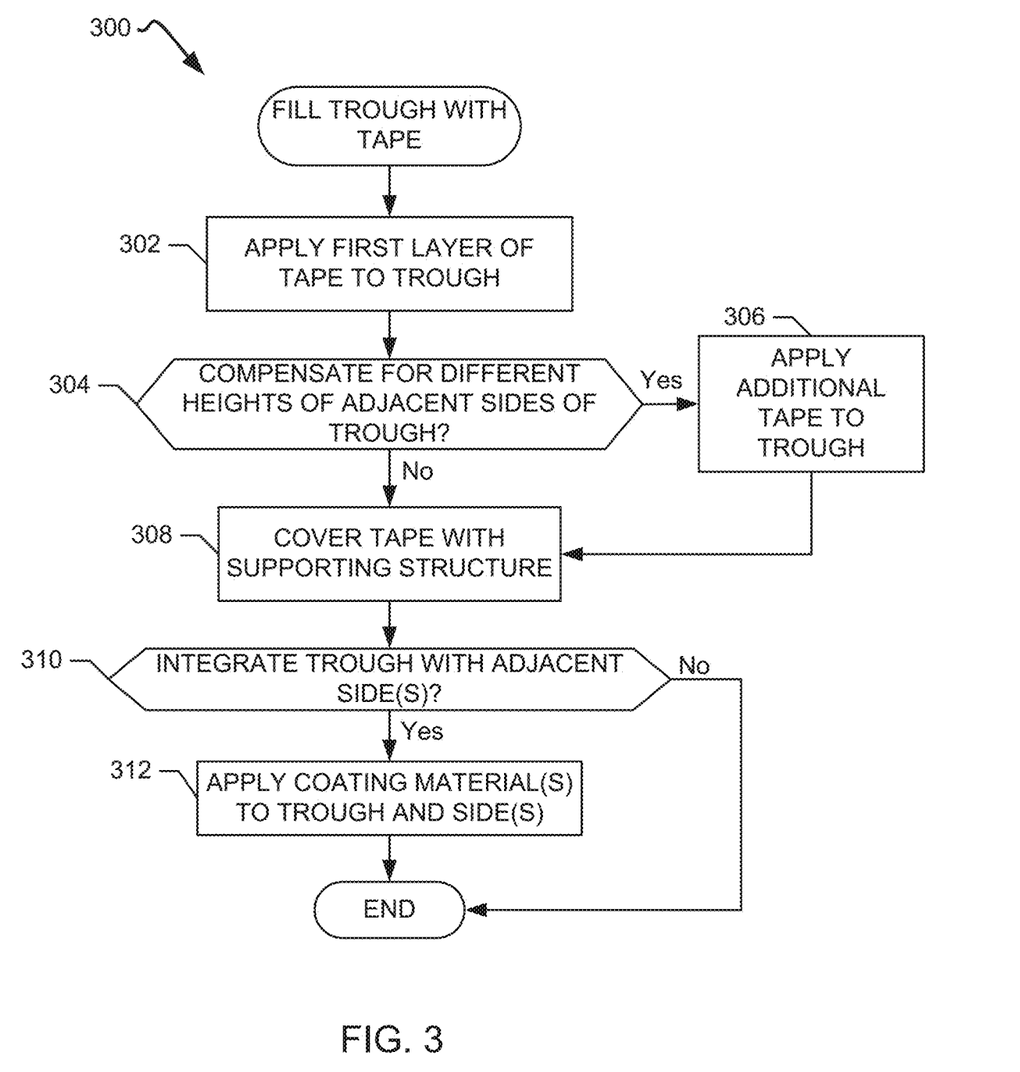
FIG. 3 is a flow chart of a first example method for filling a trough on an aircraft wing.

FIG. 3 is a flow chart of a first example method 300 for filling a trough or, more generally, a recess or a gap, formed between two surfaces of a vehicle, such as between two surfaces of a wing of an aircraft. The first example method 300 may be implemented in connection with the wing 200 of FIG. 2, and, more generally, the aircraft 100 of FIG. 1 and/or other types of vehicles. In describing one or more aspects of the first example method 300 below, reference will be made to a first example trough 400, a second example trough 500, and a third example trough 600 illustrated in FIGS. 4-6, respectively. The first through third example troughs 400, 500, 600 may be located, for example, on the wing 200 of FIG. 2. Also, the first example method 300 can be implemented to fill recesses or openings having different shapes and/or sizes from those illustrated in FIGS. 4-6.

The first example method 300 provides for filling a trough with tape. At block 302, an interior of a trough is filled with a layer of tape. The tape is applied to, for example, a supporting (e.g., bottom) surface of the trough. The tape used to fill the interior of the trough is selected based on or more characteristics of the tape, including, but not limited to, thickness, temperature resistance, and/or color. For example, the tape may be a pressure sensitive tape, such as a very high bond (VHB) tape. VHB tape is available in a range of thicknesses (e.g., 5 mil to 25 mil). Further, VHB tape can withstand a range of high temperatures (e.g., 160° to 300° Fahrenheit). At block 302, the VHB tape may be selected based on a thickness of the tape in view of the depth of the trough.

Figure 4:
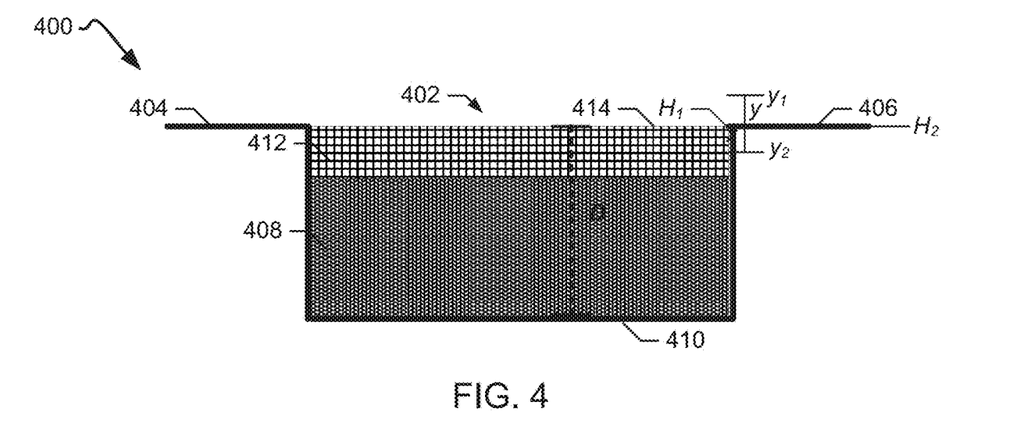
FIG. 4 is a cross-sectional view of a first example trough filled according to the first example method of FIG. 3.

FIG. 4 illustrates the first example trough 400 filled via the first example method 300 of FIG. 3. The first example trough 400 has an interior 402 formed between a first panel 404 and a second panel 406, which define edges of the trough or recess 400. As shown in FIG. 4, a layer of tape 408 is disposed in the interior 402 of the trough 400. The tape 408 is applied to (e.g., attached to) a surface 410 of the trough 400, which forms a bottom supporting surface of the trough 400. In some examples, the tape 408 is a VHB tape.

In the first example trough 400, the height of the first panel 404 and the second panel 406, and thus, a height of the edges of the trough 400, are substantially equal. However, in some examples, a height difference exists between the side panels defining the trough. Thus, the layer of tape applied at block 302 of the first example method 300 (e.g., the layer of tape 408 shown in FIG. 4) may not sufficiently level the height difference between the panels to create a substantially uniform surface across the trough. Returning to FIG. 3, in such examples, a decision is made at block 304 of the first example method 300 to compensate for the height difference. If a height difference is to be compensated at block 306, the trough is filled with additional tape. For example, block 306 of the example method 300 may include filling the trough with one or more additional layers of tape in a parallel configuration with respect to the layer of tape applied at block 302 (e.g., on top of the layer of tape applied at block 302). In other examples, the one or more additional layers of tape are applied adjacent to the layer of tape applied at block 302, as will be described in connection with FIG. 5. The additional tape applied at block 306 may have the same or different characteristics as compared to the tape applied at block 302. For example, the tape applied at block 302 may be thicker or thinner than the tape applied at block 306. Such a difference in the thicknesses of the tapes creates a surface that follows the sloped profile of the trough due to the height differences between the side panels, thereby filling the trough and reducing the height difference.

Figure 5:
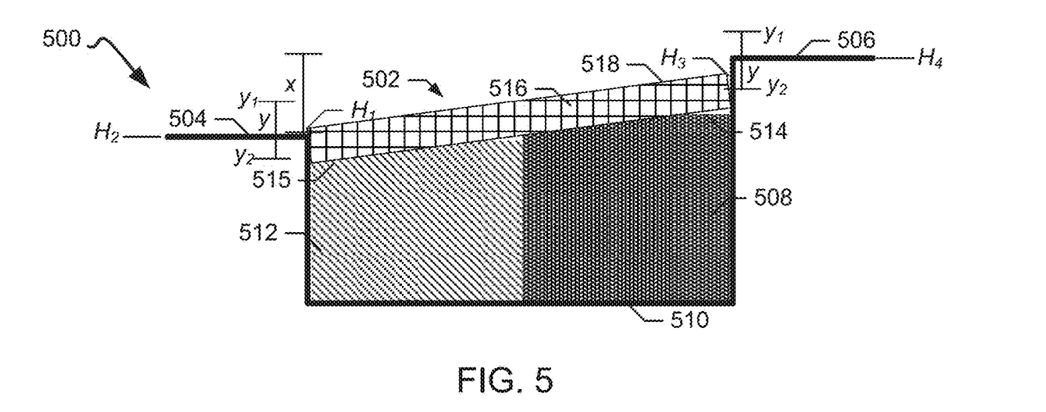
FIG. 5 is a cross-sectional view of a second example trough filled according to the first example method of FIG. 3.

As an example of a trough having a height difference between the adjacent panels forming the edges of the trough, FIG. 5 illustrates the second example trough 500 having an interior 502 formed between a first panel 504 and a second panel 506. As illustrated in FIG. 5, a height difference x exists between the first panel 504 and the second panel 506 such that the second panel 506 is higher than the first panel 504. A first layer of tape 508 is applied to a surface 510 of the second trough 500 in accordance with block 302 of the example method 300. However, because of the height difference x between the first and second panels 504, 506, applying a single layer of the tape 508 across the surface 510 does not provide for a level surface between the first panel 504 and the second panel 506. Thus, a second layer of tape 512 is attached to the surface 510 adjacent to the first layer of tape 508 and proximate to the first panel 504 such that the first layer of tape 508 forms a first leveling surface 514 and the second layer of tape forms a second leveling surface 515. In the second example trough 500, the second layer of tape 512 is thinner than the first layer of tape 508 to compensate for the lower height of the first panel 504. That is, the first leveling surface 514 of the thicker first layer of tape 508 is proximate to the second panel 506 to compensate for the height difference x relative to the second panel 506 and the second leveling surface 515 of the thinner second layer of tape 512 is proximate to the first panel 504 to compensate for the height difference x relative to the first panel 504. Thus, the first layer of tape 508 and the second layer of 512 enable the interior 502 of the trough 500 to be substantially filled in view of the height difference x without overcompensating for the height difference x by only applying the thicker first layer of tape 508 (and, thus, overfilling the trough 500) or undercompensating for the height difference x by only applying the thinner second layer of tape 512 (and, thus, underfilling the trough 500).

As described in connection with the example troughs 400, 500 of FIGS. 4 and 5, the layer(s) of tape substantially fill the interiors of the troughs. Returning to FIG. 3, the example method 300 continues at block 308 at which the tape is covered with a supporting structure. In some examples, the supporting structure is a metal or fiberglass plate. The plate protects the tape from environmental factors such as exposure to water and deformation due to, for example, external objects impacting the tape. Also, in some examples, the tape is double-sided (e.g., capable of attaching to surfaces via both sides of the tape). Covering the tape with the supporting plate thus prevents external objects from sticking to the tape.

As shown in the first example trough 400 of FIG. 4, a plate 412 may be inserted into the interior 402 of the trough 400 proximate to the tape 408. In some examples, the plate 412 is attached to one or more of the first panel 404 or the second panel 406 via fasteners (e.g., screws) and/or attaches to the layer of tape 408. As shown in FIG. 4, the plate 412, in conjunction with the tape 408, forms a substantially level surface 414 between the first surface 404 and the second surface 406. The level surface 414 substantially eliminates the gap created by the first and second panels 404, 406, thereby reducing opportunities for disruptions to the flow of air over the trough 400.

As another example of implementation of block 308 of the first example method 300, FIG. 5 shows the second example trough 500 including a plate 516 installed proximate to the first leveling surface 514 created by the first layer of tape 508 and the second leveling surface 515 created by the second layer of tape 512. In the second example trough 500, the plate 516 compensates for the height difference x between the first panel 504 and the second panel 506 by creating a third leveling surface 518. The third leveling surface 518 extends between the first panel 504 and the second panel 506 and, in association with the first leveling surface 514 of the first layer of tape 508 and the second leveling surface 515 of the second layer of tape 512, substantially eliminates the gap created by the first and second panels 504, 506. Further, the plate 516 serves to compensate for any gaps in the interior 502 that may result due to the different thicknesses of the first layer of tape 508 and the second layer of tape 512 so that a maximum volume of the interior 502 of the trough 500 is filled. For example, the plate 516 may press down on the first leveling surface 514 of the first layer of tape 508 (e.g., slightly deform the first layer of tape 508) such that the first level surface 514 of the first layer of tape 508 and the second level surface 515 of the second layer of tape 512 are substantially aligned to reduce or eliminate any gaps or spacing that may exist in the interior 502 of the trough 500 due to the different thickness of the first and second layers of tape 508, 512.

In both the first example trough 400 of FIG. 4 and the second example trough 500 of FIG. 5, the filled troughs 400, 500, including the respective layers of tape 408, 508, 512 and the plates 412, 516, are substantially level with the respective panels 404, 406 of FIG. 4 and the panels 504, 506 of FIG. 5 within a tolerance range y having an upper limit $y_1$ and a lower limit $y_2$. The tolerance range y permits the troughs 400, 500 to be filled to a height greater than or less than the heights of the surfaces of the respective panels that define the edges of the troughs 400, 500 within a specified range. The tolerance range y allows for a degree of flexibility in filling the trough but also provides for the filling materials (e.g., the tape and the plate) to be applied in a manner to increase laminar flow. The upper limit $y_1$ of the tolerance range y prevents the trough from being filled to a level greater than the height of the panels such that the filling materials create further opportunities for turbulent flow by acting as a projection that the air must flow over. The lower limit $y_2$ of the tolerance range y prevents the trough from being filled to a level below the height the panels such that the filling materials do not adequately fill the trough, and thus, do not increase laminar flow. Thus, the tolerance range y provides for a substantially smooth profile of, for example, the wing 200 of FIG. 2, while allowing for a degree of flexibility that accounts for implementation variances such as uneven surfaces along the length of the trough or imprecise application of the filling materials.

Referring to the first example trough 400 of FIG. 4, to meet the tolerance range y, the thickness of the tape 408 and the plate 412 are selected so that a total depth D of the filling materials results in the level surface 414 being substantially aligned with the first panel 404 and the second panel 406 within the tolerance limits $y_1$ and $y_2$. Thus, the level surface 414 is at a height $H_1$, which is substantially equal to a height $H_2$ of the first panel 404 (e.g., defining a first edge of the trough 400) and the second panel 406 (e.g., defining a second edge of the trough 400). As an example, the tolerance range y may allow for the height $H_1$ of the level surface 414 to be no greater than 4 mils, or approximately 100 nanometers, above the height $H_2$ of the first panel 404 and the second panel 406 (i.e., $y_1$=+4 mils). The tolerance range y may allow for the height $H_1$ of the level surface 414 to be no less than 2 mils below the height $H_2$ of the first panel 404 and the second panel 406 (i.e., $y_2$=−2 mils). Thus, the tolerance range y provides for an over/under allowance with respect to the height of the level surface created by the filling materials relative to the heights of adjacent panels (e.g., +4 mils/−2 mils).

In some examples, the tolerance range y varies relative to the leading edge and the trailing edge of an example aircraft wing with which the first example trough 400 can be associated (e.g., the wing 200 of FIG. 2). The tolerance range y may be smaller at the trailing edge because a thickness of the wing at the trailing edge is less than a thickness of the wing at the leading edge, such that less height variability of the level surface 414 is allowed at the trailing edge to account for the lesser thickness. For example, in the first example trough 400, the first panel 404 may be associated with the leading edge of the wing 200 and the second panel 406 may be associated with the trailing edge of the wing 200. Because a thickness of the second (trailing) panel 406 is less than a thickness of the first (leading) panel 404, any variability with respect to the alignment of the level surface 414 with the second (trailing) panel 406 has an increased effect on the flow of air as compared to the alignment of the level surface 414 with first (leading) panel 404. For example, if the height $H_1$ of the level surface 414 was greater when measured at the second (trailing) panel 406 than when measured at the first (leading) panel 404, a fluid flowing over the trough 400 could be disrupted when encountering the second (trailing) panel 406. The disruption could occur because the increased height $H_1$ of the level surface 414 at the second (trailing) panel 406 would act as a projection in view of the lesser thickness of the second (trailing) panel 406 as compared to the first (leading) panel 406. Such a projection could interrupt the fluid flow. Therefore, in some examples, the tolerance range y may be tighter at the trailing edge than at the leading edge. In such examples, less allowance is permitted for the height $H_1$ of the level surface 414 when measured at the second panel 406 as compared to the height $H_1$ of the level surface 414 when measured at the first panel 404 (e.g., $y_1$=+2 mils with respect to the height $H_2$ of the second panel 406, whereas $y_1$=+5 mils with respect to the height $H_2$ of the first panel 404, thereby allowing for less variability in the height $H_1$ of the level surface 414 at the second panel 406). Thus, in filling the first example trough 400, adjustments may be made to the thickness of the tape 408 and/or the plate 412 to meet the tolerance range y at each of the edges of the trough or recess 400 that correspond to the leading edge and the trailing edge of the wing 200. For example, the thickness of the layer of the tape 408 may be varied by applying an additional partial layer of tape at the leading edge to account for any height variations along the length of the first example trough 400.

Similarly, with respect to the second example trough 500 of FIG. 5, a first height $H_1$ of the third leveling surface 518 proximate to the first panel 504 falls within the tolerance range y relative to a height $H_2$ of first panel 504 and a second height $H_3$ of the third leveling surface 518 proximate to the second panel 506 falls within the tolerance range y relative to a height $H_4$ of the second panel 506. Because of the height difference x between the first panel 504 and the second panel 506, the third leveling surface 518 meets the tolerance range y with respect to heights of each of the first panel 504 and the second panel 506 (e.g., +4/−2 mils at each panel defining edges of the recess 500). In some examples, the tolerance range y varies at the first panel 504 and the second panel 506 to account for the thickness of the trailing and leading edges of the vehicle with which the panels are associated, as disclosed above with respect to the first example trough 400. Therefore, in selecting the thicknesses of the first layer of tape 508, the second layer of tape 512, the plate 516, and/or other layers of tape, etc. used to fill the trough 500 and the arrangement of the materials in the interior 502 of the trough 500, consideration is given to meeting the tolerance range y to create a substantially level surface having a tight tolerance across the trough 500.

As described above, the examples troughs 400, 500 are filled in accordance with blocks 302, 304, 306, and 308 of the first example method 300 of FIG. 3 such that the troughs are level with the adjacent panels forming the troughs 400, 500. However, in some examples, further integration of the leveling created by the filling materials with the adjacent surfaces or panels is provided. For example, rather than the level surface 414 of FIG. 4 being a separate surface from the surfaces of adjacent first and second panels 404, 406, the level surface 414 may be a single surface extending across the trough 400 and one or more of the first panel 404 or the second panel 406.

The first example method 300 of FIG. 3 provides for optional integration of the trough with one or more of the adjacent panels. In some examples, at block 310, a decision is made to integrate the trough with the adjacent side(s). If the trough is not to be integrated with the adjacent side(s), the first example method 300 ends with a surface of the supporting structure (e.g., the metal plates 412, 516) serving as the leveling surface for alignment with the adjacent sides. For example, in the first example trough 400 of FIG. 4, the level surface 414 of the plate 412 serves to increase laminar flow over the trough 400 by creating a substantially smooth profile between the first panel 404 and the second panel 406.

If a decision is made to integrate the trough with the adjacent panel(s), the first example method 300 proceeds to block 312, where one or more coating materials are applied to the supporting structure and one or more of the adjacent sides. The coating materials are, for example, a surfacer, a base coat, and/or a top coat. As will be described in connection with FIG. 6, the coating materials serve to further level the trough with the adjacent sides to meet the tolerance range.

Figure 6:
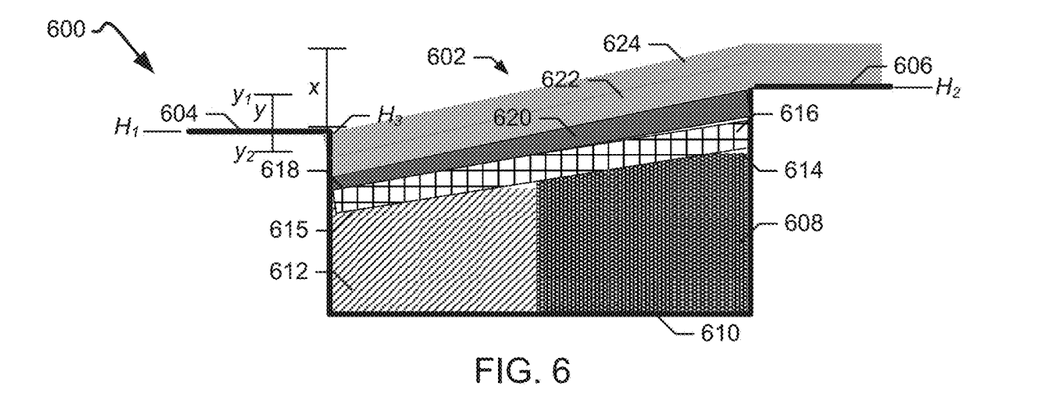
FIG. 6 is a cross-sectional view of a third example trough filled according to the first example method of FIG. 3.

FIG. 6 illustrates a third example trough 600 filled via the first example method 300 of FIG. 3 and, in particular, depicts an example implementation of blocks 310 and 312 of the first example method 300. The third example trough 600 has an interior 602 formed between a first panel 604 and a second panel 606. A height difference x exists between the first panel 604 and the second panel 606. A first layer of tape 608 is applied to a surface 610 of the interior 602 of the third example trough 600 to form a first leveling surface 614. To account for the height difference x, the third example trough 600 includes a second layer of tape 612 to form a second leveling surface 615 to fill the trough 600 substantially as described in connection with the second example trough 500 of FIG. 5. The third example trough 600 includes a plate 616 proximate to the first leveling surface 614 and the second leveling surface 615. The plate 616 creates a third leveling surface 618.

In the third example trough 600, the second level surface 616 is located a distance below a height $H_1$ of the first panel 604 and a height $H_2$ of the second panel 606. To level the third example trough 600 with the first panel 604 and the second panel 606, a surfacer 620 is applied to the third leveling surface 618 of the plate 616. The surfacer 620 prepares the plate 616 to receive a layer of paint in addition to further leveling the third example trough 600 with the surrounding first and second panels 604, 606. In some examples, the surfacer 620 is not applied.

In the third example trough 600, a base coat 622 is applied to the surfacer 620. To integrate the third example trough 600 with, for example, the second panel 606, the base coat 622 is applied across a surface of the second panel 606 and across the surfacer 620 disposed in the third example trough 600. In some examples, a top coat 624 is applied to the base coat 622 across the second surface 606 and the trough 600.

In the third example tough 600 of FIG. 6, an end of the top coat 624 is substantially aligned with the first panel 604 to prevent chipping of the top coat 624 while still providing access to the trough 600. Also, a color of the base coat 622 and/or the top coat 624 may be selected to create a uniform surface with paint applied to a remainder of, for example, the first panel 604 and/or the second panel 606. Further, a height $H_3$ of the top coat 624 proximate to the first panel 604 falls within the limits $y_1$, $y_2$ of the tolerance range y.

Thus, in the third example trough 600, the coating materials, including the surfacer 620, the base coat 622, and the top coat 624, provide for integration of the third trough 600 with the adjacent panels 604, 606. To accommodate the coating materials in the interior 602 of the third example trough 600, the thicknesses of the first layer of tape 608, the second layer of tape 612, and/or the plate 616 are less than the thickness of the filling materials used to fill, for example, the second example trough 500 of FIG. 5, where no coating materials are applied. Such variations with respect to the thickness of the filling materials used to fill the third example trough 600 as compared to the second example trough 500 allows the coating materials to be applied to the third example trough 600 to, for example, create a uniformly colored surface across the trough and panels, while still providing for leveling of the trough 600 within the tolerance range y.

Thus, the first example method 300 provides for filling a trough with tape to substantially eliminate a gap between two surfaces of an aircraft wing. The thickness and arrangement of the tape can be selected to accommodate troughs of different sizes and configurations and/or to account for the application of coating materials to meet operational tolerance requirements as well as, for example, aesthetic qualities. Further, a removable supporting structure covering the tape provides for increased structural stability of the filled trough while allowing for access to the trough interior. The tape and supporting structure, in combination, fill the trough within a tolerance range relative to the surrounding surfaces and, thus, serve to increase laminar flow over the wing surface.

Figure 7:
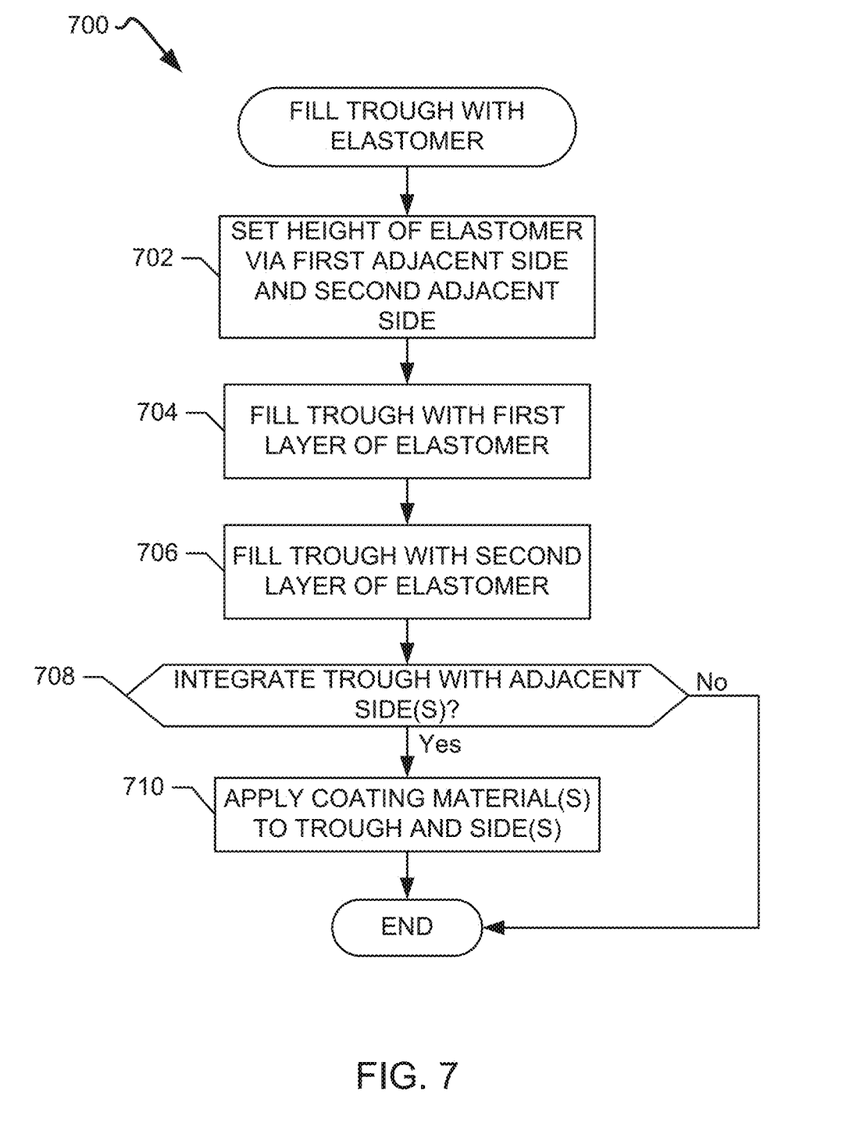
FIG. 7 is a flow chart of a second example method for filling a trough on an aircraft wing.

FIG. 7 is a flow chart of a second example method 700 for filling a trough or more generally, a recess or a gap, formed between two surfaces of a vehicle, such as between two surfaces of a wing of an aircraft. The second example method 700 may be implemented in connection with the wing 200 of FIG. 2, and, more generally, the aircraft 100 of FIG. 1 and/or other types of vehicles. In describing one or more aspects of the second example method 700 below, reference will be made to a fourth example trough 800 and a fifth example trough 900 illustrated in FIGS. 8 and 9, respectively. The fourth and fifth example troughs 800, 900 may be located, for example, on the wing 200 of FIG. 2. Also, the second example method 700 can be implemented to fill recesses or openings having different shapes and/or sizes from those illustrated in FIGS. 8 and 9.

The second example method 700 provides for filling an interior of a trough with an elastomer. The second example method 700 begins at block 702 with setting a height of the sealant via a first adjacent side and a second adjacent side (block 702). Setting the height of the sealant can include, for example, applying a layer of tape to the surfaces of the first and second adjacent sides to create a reference point for a height to which the sealant should be applied. The reference point can be determined based on the tolerance requirements for filling the trough. In some examples, the layer of tape applied to the adjacent surfaces has a thickness selected based on an upper limit of the tolerance range.

At block 704, the second example method 700 includes filling the trough with a first layer of the elastomer. The elastomer may be a sealant such as a polythioether sealant, a polysulfide-based sealant, or another type of sealant having predefined temperature-resistant, water exposure-resistant, and/or chemical-exposure resistant qualities. The sealant may be applied using, for example, a scraper having one or more notches to level the sealant based on the reference point representing the height to which the sealant should be applied relative to the adjacent sides.

Figure 8:
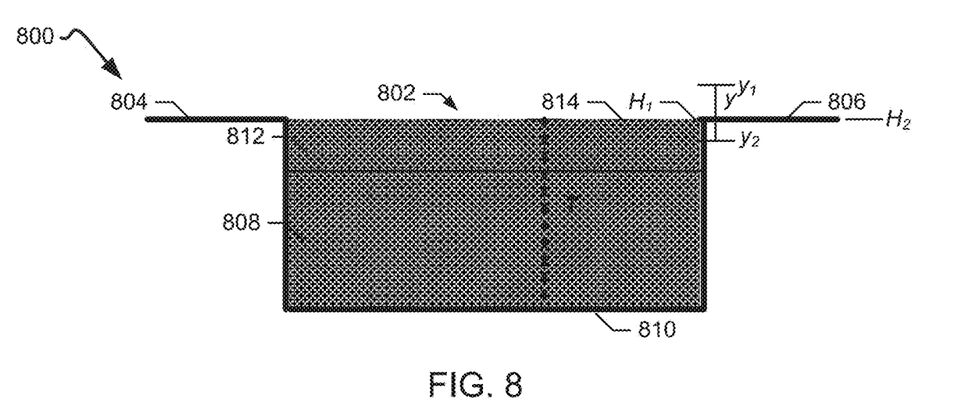
FIG. 8 is a cross-sectional view of a fourth example trough filled according to the second example method of FIG. 7.

As an illustration of the implementation of the example method 700, FIG. 8 depicts a fourth example trough 800 having an interior 802 between a first panel 804 and a second panel 806 defining edges of the trough 800. The interior 802 of the trough 800 is filled with a first layer of sealant 808 applied to a surface 810 of the trough 800. Upon applying the first layer of sealant 808 in accordance with block 704 of the example method 700, the sealant 808 cures or hardens.

Returning to FIG. 7, the example method 700 includes filling the trough 800 with a second layer of elastomer at block 706. The second layer of elastomer applied at block 706 compensates for any shrinkage of the first layer of the elastomer that can result during curing of the elastomer. The second layer of the elastomer may include the same type of elastomer as the first layer of elastomer and applied in the same manner as the first layer (e.g., using a notched scraper). Although the example method 700 provides for two layers of sealant to fill the trough 800, the example method 700 can include the application of additional layers of sealant to the trough 800 based on for example, shrinkage of the elastomer, a height of trough, etc.

FIG. 8 depicts the fourth example trough 800 having a second layer of sealant 812 proximate to the first layer of sealant 808. Upon curing, the second layer of sealant 812 forms a substantially level surface 814. As described above with respect to the first through third example troughs 400, 500, 600 of FIGS. 4-6, to create a smooth wing profile to increase laminar flow, the filling materials are leveled to substantially align with the adjacent panels within a limited degree of variability or tolerance. Thus, in the fourth example trough 800, the second layer of sealant 812 is aligned with the first panel 804 and the second panel 806 such that a height $H_1$ of the level surface 814 falls within the upper limit $y_1$ and the lower limit $y_2$ of the tolerance range y. To meet the tolerance range y, a total thickness T of the first layer of sealant 808 and the second layer of sealant 812 is selectively configured relative to the height $H_2$ of the first panel 804 and the second panel 806. The thickness T may be adjusted during application of the sealant using, for example, a scraper. In some examples, the total thickness T differs when measured at the leading edge of the aircraft wing with which the fourth example trough 800 is associated with as compared to the trailing edge of the wing. Selectively applying the sealant so that the total thickness T varies at the leading edge and the trailing edge enables the level surface 814 to meet tolerance ranges at each of the leading edge and the trailing edge (e.g., a tolerance range of +4 mils/−2 mils at the leading edge and a tolerance range of −2 mils/+4 mils at the trailing edge). Thus, in the fourth example trough 800, the substantially level surface 814 creates a smooth profile between the first panel 804 and the second panel 806.

Figure 9:
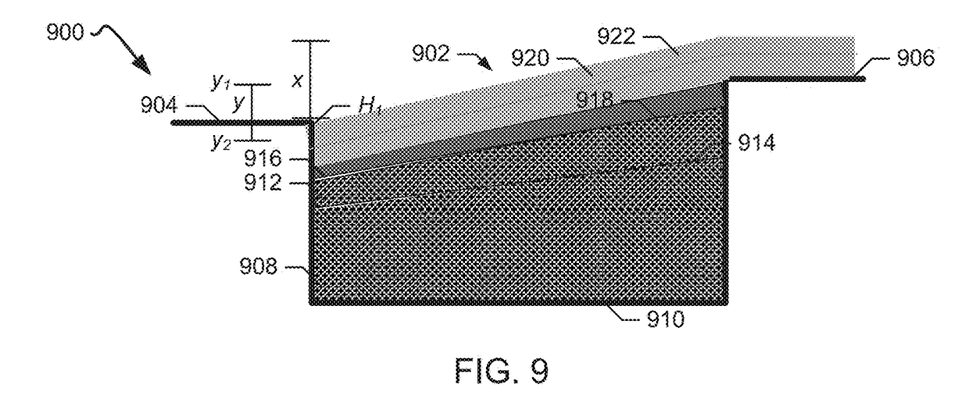
FIG. 9 is a cross-sectional view of a fifth example trough filled according to the second example method of FIG. 7.

The second example method 700 for filling a trough with an elastomer may also be implemented in troughs where a height difference exists between the adjacent panels. For example, FIG. 9 illustrates a fifth example trough 900 having an interior 902 between a first panel 904 and a second panel 906. In the fifth example trough 900, a height difference x exists between the first panel 904 and the second panel 906. Pursuant to the example method 700 of FIG. 7, the interior 902 is filled with a sealant by applying a first layer of sealant 908 to a surface 910 of trough 900 and a second layer of sealant 912 proximate to the first layer of sealant 908. In the fifth example trough 900, the configuration of one or more of the first layer of sealant 908 or the second layer of sealant 912 is adjusted to compensate for the height difference x. For example, the first layer of sealant 908 may be configured in a sloped arrangement using, for example, a scraper to shape the sealant before it is cured. The sloped arrangement of the first layer of sealant 908 creates a first leveling surface 914 to compensate for the height difference x. The second layer of sealant 912 may be applied in a similar sloped configuration to create a second leveling surface 916 to further compensate for the height difference x. Thus, the second example method 700 can be implemented in troughs having varying dimensions and configurations by selectively arranging the sealant layers in the trough.

Returning to the example method 700, in some examples, a decision is made at block 708 to integrate the trough with the adjacent sides using, for example, a coating material such as paint to create a substantially smooth surface across one or more of the adjacent sides and the trough, as described in connection with the first example method 300 of FIG. 3. If the trough is not to be integrated with the adjacent side(s), the second example method 700 ends with the second layer of the elastomer serving as the leveling surface between the adjacent sides. For example, in the fourth example trough 800 of FIG. 8, the level surface 814 of the second layer of sealant 812 serves to increase laminar flow over the trough 800 by creating a substantially smooth profile between the first and second panels 804, 806.

If a decision is made to integrate the trough and the adjacent side(s), block 710 of the example method 700 includes applying one or more coating materials, such as a surfacer, a base coat, and/or a top coat, to the trough and the adjacent side(s). The surfacer, base coat, and/or top coat may be selected based on, for example, color or water and/or chemical exposure resistant properties.

As an illustration of the integration of the trough with one or more of the adjacent sides as described at blocks 708 and 710 of the second example method 700, FIG. 9 depicts the fifth example trough 900 as including a surfacer 918, a base coat 920, and a top coat 922. The surfacer 918 may be optionally applied to the second leveling surface 916 of the second layer of sealant 912 to prepare the sealant for coating by the base coat 920 and/or the top coat 922. The top coat 922 is applied across, for example, the second panel 906 and the trough 900 to create an integrated surface that eliminates opportunities for turbulent flow.

As described above in connection with the third example trough 600 of FIG. 6, the coating materials 918, 920, 922 further serve to level the trough 900. For example, the top coat 922 is aligned with the first panel 904 such that a height H1 of the top coat 922 proximate to first panel 904 is within the limits $y_1$, $y_2$, of the tolerance range y. To accommodate the coating materials in the interior 902 of the trough 900, the thickness of the first layer of sealant 908 and/or the second layer of sealant 912 is adjusted as compared to, for example, the fourth example trough 800 of FIG. 8. Such adjustments to the thickness of the sealant layer(s) allow for the surface of the trough 900 to meet the tolerance range y with respect to the first panel 904 while serving as an integrated surface with respect to the second panel 906.

Thus, the second example method 700 provides for flexibility in filling the trough with the elastomer based on the selective configuration of the layers of the elastomer in the trough. In implementing the second example method 700, characteristics of the elastomer, such as thickness and/or shape, may be customized in view of the characteristics of the trough. For example, in some instances, the depth and/or width of the trough may vary along the length of the trough. The second example method 700 accommodates such variation within the trough, as the thickness of the elastomer can be adjusted along the length of the trough during its application according to, for example, the depth profile of the trough. In such a manner, the second example method 700 provides for customized leveling of the trough with the surrounding surfaces within the tolerance range.

Figure 10:
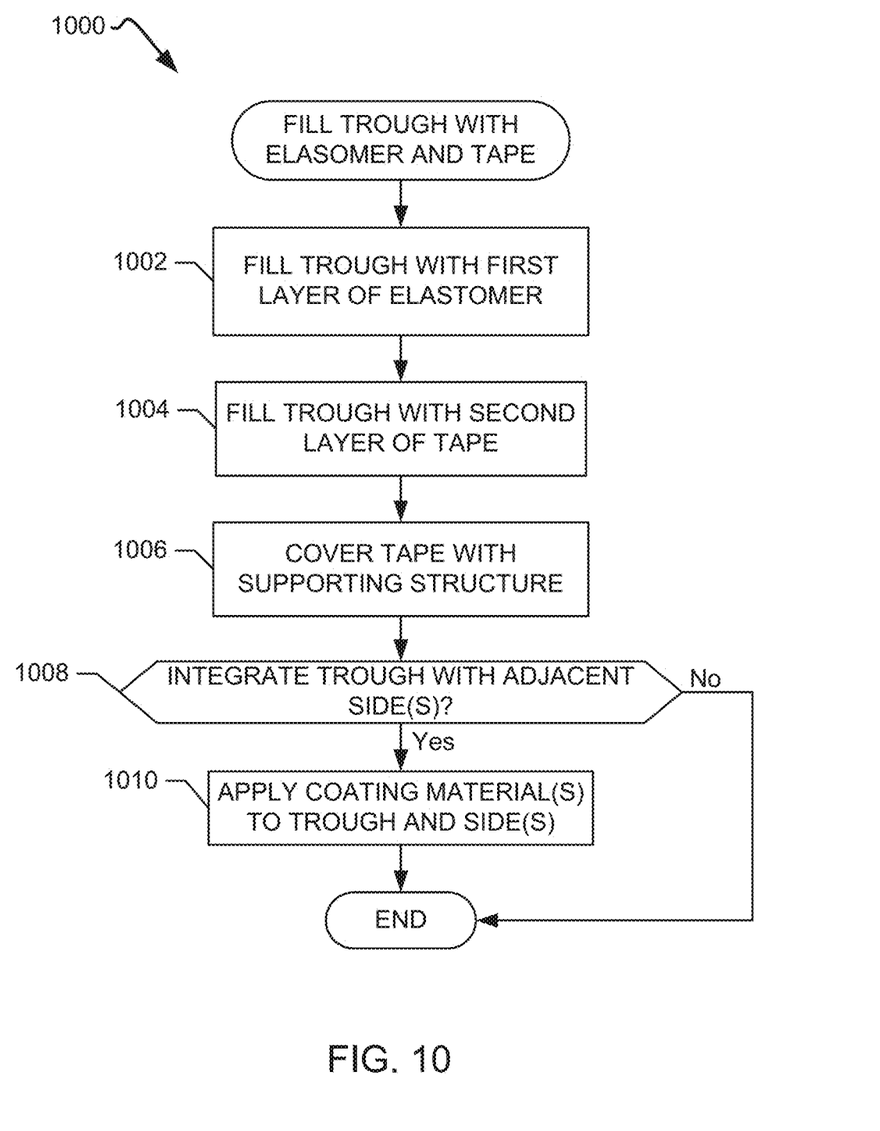
FIG. 10 is a flow chart of a third example method for filling a trough on an aircraft wing.

FIG. 10 is a flow chart of a third example method 1000 for filling a trough or, more generally, a recess or a gap, formed between two surfaces of a vehicle, such as between two surfaces of a wing of an aircraft. The third example method 1000 may be implemented in connection with the wing 200 of FIG. 2, and, more generally, the aircraft 100 of FIG. 1 and/or other types of vehicles. In describing one or more aspects of the third example method 1000 below, reference will be made to a sixth example trough 1100 and a seventh example trough 1200 illustrated in FIGS. 11 and 12, respectively. The sixth and seventh example troughs 1100, 1200 may be located, for example, on the wing 200 of FIG. 2. Also, the third example method 1000 can be implemented to fill recesses or openings having different shapes and/or sizes from those illustrated in FIGS. 11 and 12.

The third example method 1000 provides for filling an interior of a trough with an elastomer and a tape. At block 1002, the trough is filled with a first layer of the elastomer. The first layer of the elastomer is applied in substantially the same manner as described above in connection with the second example method 700 of FIG. 7 (e.g., block 704). The first layer of the elastomer serves to create a foundation, or first leveling surface, upon which additional filling materials, such as the tape, may be disposed. In some examples, the depth of the trough may vary along the length of the trough and include valleys, surface roughness, etc. on the supporting or bottom surface of the trough. Filling the trough with the elastomer substantially eliminates the variability along the bottom surface and creates a substantially uniform level upon which to further fill the trough.

In filling the trough with the elastomer, the thickness of the elastomer and/or the configuration (e.g., sloped) may be adjusted using a scraper. In applying the sealant to level and/or smooth the bottom surface, the thickness of the sealant is adjusted in view of the thickness of the other filling materials (e.g., the tape) and the tolerance requirements for filling the trough. The elastomer may be, for example, a polythioether sealant or a polysulfide-based sealant. In the example method 1000, the elastomer cures to form a substantially solid surface.

At block 1004, the trough is filled with a tape, such as a pressure-sensitive tape, substantially as described in connection with the first example method 300 of FIG. 3 (e.g., blocks 302, 306). The tape is applied to a surface of the cured elastomer. The type of tape may selected based on characteristics such as thickness and/or temperature resistance. For example, the thickness of the tape may be selected in view of the thickness of the first layer of elastomer and based on tolerance requirements for filling the trough. In implementing the third example method 1000, additional layers of the elastomer and/or the tape may be applied to the trough.

At block 1006, the example method 1000 includes covering the tape with a supporting structure. As described in connection with the example method 300 of FIG. 3 (e.g., block 308), the supporting structure, which may be a metal plate, provides additional structure to the second layer of tape and also covers the double-sided tape to prevent external objects from sticking to the tape.

Figure 11:
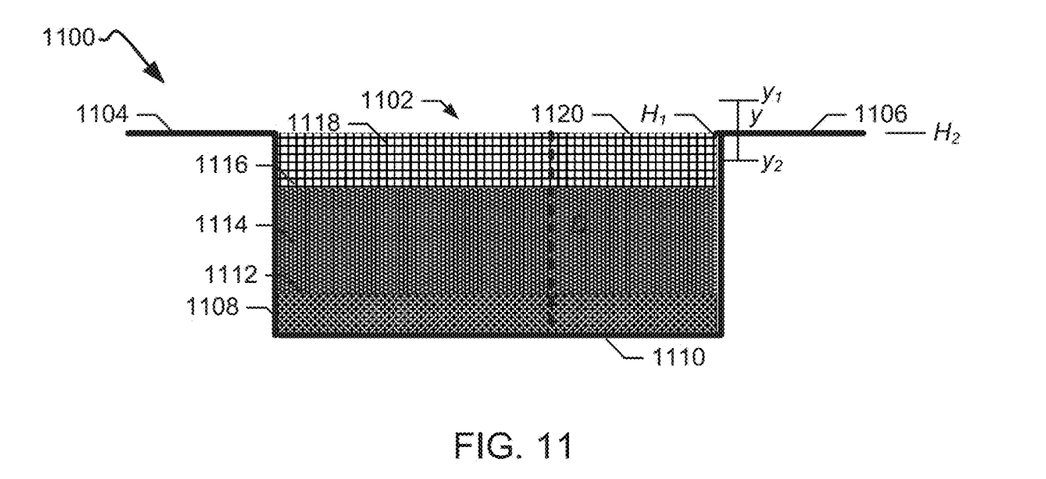
FIG. 11 is a cross-sectional view of a sixth example trough filled according to the third example method of FIG. 11.

As an illustration of the implementation of blocks 1002, 1004, and 1006 of the example method 1000, FIG. 11 depicts the sixth example trough 1100 including an interior 1102 defined by a first panel 1104 and a second panel 1106, each of which correspond to an edge of the trough or recess 1100. As shown in FIG. 11, a first layer of elastomer 1108 is applied to a surface 1110 of the trough 1100. The first layer of elastomer 1108, upon curing, forms a first leveling surface 1112 upon which a second layer of tape 1114 is applied. The second layer of tape 1114 creates a second leveling surface 1116 to which a metal plate 1118 is attached.

In the sixth example trough 1110, the thicknesses of the first layer of the sealant 1108, the second layer of tape 1114, and the metal plate 1118 are selected such that a surface 1120 of the metal plate 1118 is substantially aligned with the first panel 1104 and the second panel 1106. In particular, a height $H_1$ of the surface 1120 falls within the upper limit $y_1$ and the lower limit $y_2$ of the tolerance range y with respect variance from a height $H_2$ of the first panel 1104 and the second panel 1106. In some examples, the height $H_1$ of the surface 1120 meets a first tolerance range y at the leading edge of the wing with which the sixth example trough 1100 is associated and a second tolerance range y at the trailing edge of the wing. In such examples, the thicknesses of the first layer of sealant 1108, the second layer of tape 1114, and/or the metal plate 1118 can differ when measured at the leading edge as compared to the trailing edge to meet the tolerance requirements at each edge. Such variations in thickness throughout the sixth example trough 1100 may be achieved by, for example, applying the first layer of sealant 1108 in a thinner configuration at the trailing edge as compared to the leading edge.

Returning to the example method 1000, at block 1008, a decision is made whether to integrate the trough with the adjacent side(s). As described in first example method 300 of FIG. 3 (e.g., blocks 310, 312) and the second example method 700 of FIG. 7 (e.g., blocks 708, 710), in some examples, the trough surface is integrated with one or more the adjacent surfaces to create a substantially uniform surface. In some such examples, the coating materials further serve to fill and level the trough relative to the adjacent sides.

If the trough is not to be integrated with the adjacent side(s), the third example method 1000 ends with a surface of the supporting structure (e.g., the metal plate 1118) serving as the leveling surface of the trough with respect to the adjacent sides. For example, in the sixth example trough 1100 of FIG. 11, the level surface 1120 of the plate 1118 serves to increase laminar flow over the trough 1100 by creating a substantially smooth profile between the first panel 1104 and the second panel 1106. If the trough is to be integrated with the adjacent side(s), then the third example method 1000 proceeds to block 1010, where coating materials are applied to the trough and one or more adjacent sides. The coating materials may include, for example, a surfacer, a base coat, and/or a top coat.

Figure 12:
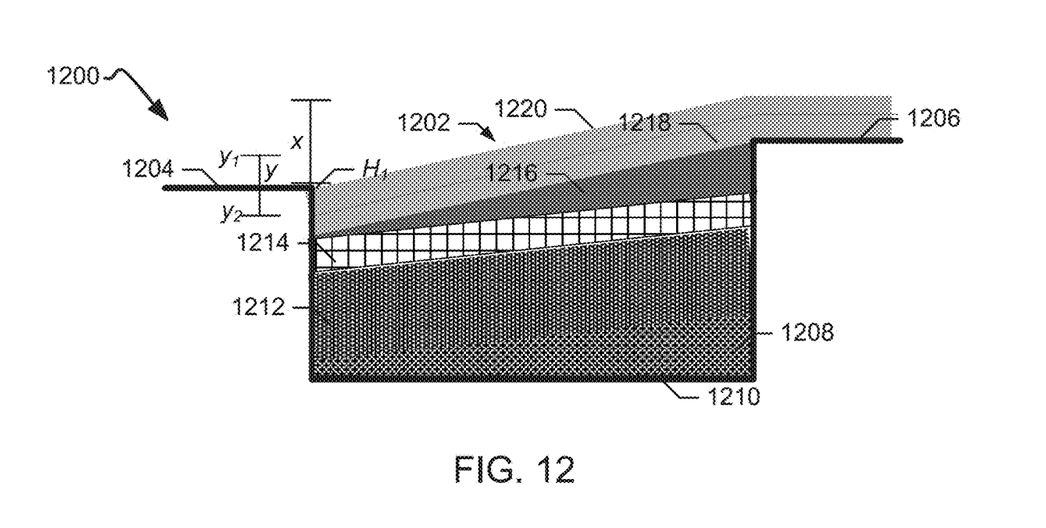
FIG. 12 is a cross-sectional view of a seventh example trough filled according to the third example method of FIG. 10.

As an example of the integration of the trough with the adjacent side(s) according to the third example method 1000, FIG. 12 depicts a seventh example trough 1200 including an interior 1202 defined by a first panel 1204 and a second panel 1206. In the seventh example trough 1200, a height difference x exists between the first panel 1204 and the second panel 1206. As shown in FIG. 12, a first layer of elastomer 1208 is applied to a surface 1210 of the trough 1200, a second layer of tape 1212 is applied proximate to the first layer of elastomer 1208, and a metal plate 1214 is disposed in the interior 1202 to cover the second layer of tape 1212. Because of the height difference x, the first layer of elastomer 1208, the second layer of tape 1212, and the metal plate 1214 are configured in a sloped arrangement to compensate for the height difference x.

The seventh example trough 1200 also includes a surfacer 1216 applied to the metal plate 1214, a base coat 1218, and a top coat 1220. In the seventh example trough 1200, the based coat 1218 and the top coat 1220 are applied across the second panel 1206 and the trough 1200 to create an integrated surface that substantially eliminates the gap created by the trough 1200. Also, as described above in connection with the third example trough 600 of FIG. 6 and the fifth example trough 900 of FIG. 9, the coating materials 1216, 1218, 1220 further serve to fill and level the trough 1200 with the tolerance range y. In the seventh example trough 1200, an end of the top coat 1220 proximate to the first panel 1204 has a height $H_1$ falls within the upper and lower limits $y_1$, $y_2$, of the tolerance range y. To accommodate the coating materials 1216, 1218, 1220, the thickness of one or more of the first layer of elastomer 1208, the second layer of tape 1212, and the plate 1214 is adjusted as compared to the sixth example trough 1100 of FIG. 11 so that the filling materials (e.g., the elastomer, tape, paint) are not outside the tolerance range y. In such a manner, the third example method 1000 of FIG. 10 enables filling and leveling of the trough and may further provide for integrating the trough with the surrounding surface(s) within an allowable tolerance.

Thus, in implementing the third example method 1100, a trough can be filled and leveled with a combination of materials, including, for example, an elastomer and tape. In the third example method 1100, the elastomer serves as a first leveling surface to compensate for variances or unevenness that may be associated with the bottom supporting surface of the trough. In combination with the tape, the third example method 1100 provides for flexibility in filling the trough using a variety of materials that cumulatively level the trough relative to the surrounding surfaces. Each of the layers of the filling materials may be selectively adjusted in terms of thickness to address variations in trough depth and width. For example, the trough can be filled with a first, thin layer of a sealant to even out valleys on the bottom surface of the trough. A second, thicker layer of tape can be applied in connection with the metal plate to provide additional structural stability to the trough. The combination of materials provides for filling and leveling a trough that differs in size from other troughs and which also contain inconsistencies within the trough while meeting a standardized tolerance requirements.

From the foregoing, it will be appreciated that the above-disclosed methods and apparatus provide for filling a recess or opening such as a trough on a vehicle by building a level surface relative to the surrounding surfaces using materials that can be applied to troughs of varying sizes and configurations. The filling materials can be selected based on properties such as thickness in view of the depth and/or width of the trough and applied with minimal tools and/or skill. The filling materials can be removed to facilitate access to the trough during maintenance and replaced without requiring a high degree of precision when implementing the examples disclosed herein.

Further, a height of the level surface relative to the height of the surrounding surfaces falls within a specified tolerance range to create a substantially smooth surface across the trough and surrounding surfaces. By selectively arranging the filling materials in the trough, the resulting level surface can meet strict tolerance requirements at, for example, both the leading edge and the trailing edge of a wing of an aircraft. In filling the opening of the trough, the resulting level surface reduces opportunities for turbulent flow that may result when a fluid flowing over the vehicle encounters a gap between components of the vehicle (e.g., panels). The level surface can optionally be integrated with the surrounding surfaces using, for example, paint, to substantially eliminate gaps created by the trough. As a result of the alignment of the level surface with the adjacent sides, laminar flow over the vehicle profile (e.g., aircraft wing profile) is increased, thereby promoting operational efficiencies during operation of the vehicle.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
    applying one or more of a tape or a sealant along an interior of a recess between a first surface and a second surface of a vehicle to move through a fluid;
    leveling the one or more of the tape or the sealant to a first height at a first edge of the recess;
    leveling the one or more of the tape or the sealant to a second height at a second edge of the recess, the second height different from the first height;
    applying a plate proximate to the one or more of the tape or the sealant; and
    coating the one or more of the tape or the sealant with a coating material to modify a fluid dynamic property of a fluid flow over the vehicle, the coating material to be at least partially disposed in the recess, a first end of the coating material to be approximately flush with the first edge of the recess and a second end of the coating material to extend over the second edge of the recess and to be disposed on at least a portion of the second surface of the vehicle, the plate to be disposed between the coating material and the one or more of the tape or the sealant.

2. The method of claim 1, wherein the vehicle is an aircraft, a watercraft, an automobile, or a projectile and the fluid dynamic property is an aerodynamic property or a hydrodynamic property.

3. The method of claim 1, wherein the coating of the one or more of the tape or the sealant with the coating material is to modify the fluid dynamic property of the fluid flow by increasing laminar flow over the vehicle.

4. The method of claim 1, wherein applying the one or more of the tape or the sealant comprises applying a first layer of tape having a first thickness and a second layer of tape having a second thickness to the interior of the recess.

5. The method of claim 1, wherein a depth of the recess at the first edge is greater than a depth of the recess at the second edge.

6. The method of claim 1, wherein the recess is a structural trough between the first surface of the vehicle and the second surface of the vehicle.

7. The method of claim 1, wherein the coating material has a substantially sloped configuration between the first edge and the second edge of the recess.

8. The method of claim 1, wherein the plate defines sloped surface between the first edge and the second edge of the recess.

9. A method comprising:
    filling a recess between a first surface of a vehicle and a second surface of the vehicle with a first material to create a first layer in the recess;
    filling the recess with a second material to create a second layer proximate to the first layer;
    adjusting a first height of one or more of the first layer or the second layer relative to an edge the first surface;
    adjusting a second height of the one or more of the first layer or the second layer relative to an edge of the second surface, the second height different than the first height;
    covering at least one of the first material or the second material with a plate;
    applying a third material to the one or more of the first layer or the second layer to create a third layer to increase laminar flow of a fluid over the vehicle, at least a portion of the third material disposed in the recess, the plate disposed between the third material and the at least one of the first material or the second material; and
    adjusting a first height of the third layer to be approximately flush with the edge of the first surface; and
    adjusting a second height of the third layer to extend over the edge of the second surface and to be disposed on at least a portion of the second surface.

10. The method of claim 9, wherein the fluid is at least one of air or water and the fluid is to flow over the recess during movement of the vehicle.

11. The method of claim 9, wherein the third material is a coating material and the second surface and the third layer are to form a third surface.

12. The method of claim 9, wherein the first material comprises an elastomer and the second material comprises pressure sensitive tape or the elastomer.

13. The method of claim 9, wherein the first layer is to substantially compensate for a difference between the height of the first surface and a second height of the second surface.

14. The method of claim 9, wherein at least one adjusting the first height of the one or more of the first layer or the second layer or adjusting the second height of the one or more of the first layer or the second layer further comprises:
    applying the first material in a first substantially angled configuration in the recess, wherein the first material has a first height proximate to the first surface and a second height proximate to the second surface; and
    applying the second material in a second substantially angled configuration relative to the first material.

15. The method of claim 9, wherein the first surface, the second surface, and the third layer form a fourth surface.

16. An apparatus comprising:
a trough formed by a first surface of a vehicle and a second surface of the vehicle, the first surface adjacent the second surface, the vehicle to move through a fluid;
one or more of a first layer or a second layer disposed in the trough, wherein the first layer comprises an elastomer and the second layer comprises a tape, and wherein the one or more of the first layer or the second layer are to substantially form a third surface, the third surface having a first height at an edge of the first surface and a second height at an edge of the second surface, the first height different from the second height;
a plate disposed in the trough, the plate to cover at least one of the first layer or the second layer; and
a third layer covering the third surface, the third layer to adjust a fluid dynamic property of a fluid flow over the vehicle, at least a portion of the third layer disposed in the trough, a first end of the third layer approximately flush to the edge of the first surface and a second end of the third layer to extend over the edge of the second surface and to be disposed on at least a portion of the second surface, the plate disposed between the third layer and the at least one of the first layer or the second layer.

17. The apparatus of claim 16, wherein the vehicle is an aircraft, and wherein the first surface and the second surface are associated with a wing of the aircraft, the trough extending a length of the wing, and wherein the edge of the first surface is a first edge of the wing and the edge of the second surface is a second edge of the wing.

18. The apparatus of claim 17, wherein the fluid is air and the fluid dynamic property is a degree of resistance to the fluid flow of the air over the wing.

19. The apparatus of claim 16, wherein the first surface has a first height and the second surface has a second height and wherein at least one of the first layer or the second layer is disposed in an interior of the trough in a substantially sloped configuration to level the third surface relative to the first surface.

20. The apparatus of claim 16, wherein the third layer comprises a coating material.

\* \* \* \* \*